Patented May 24, 1949

2,470,952

UNITED STATES PATENT OFFICE 2,470,952

PRODUCTION OF CHLORINATED SYNTHETIC RUBBERS

Theron P. Remy, Los Angeles, Calif.

No Drawing. Application February 7, 1945,
Serial No. 576,711

2 Claims. (Cl. 260—85.1)

This invention relates to the production of chlorinated synthetic rubbers of the butadiene-styrene copolymer type which are commonly known as GRS rubbers, the chlorinated rubber being produced from either the latex form or the coagulation form.

It is an object of the present invention to produce a low viscosity chlorinated synthetic rubber when in solution in suitable solvents as high flash naptha, hydrogenated petroleum solvents, and aromatic or other suitable solvents for coatings and finishes. A principal difficulty in chlorinated rubbers of all types has been excessive viscosity even at low concentration which has retarded the most extensive use of this type material.

It is a further object of the invention to obtain a higher density material to reduce bulk for such operations as thermoplastic molding, particularly in view of preheating the chlorinated rubber mass just prior to forming in the die.

A further object of the invention is the prevention of pasty, sticky chlorinated synthetic rubbers which often results from autoxidation processes within the synthetic rubber polymer.

The invention includes other objects and features of advantage, some of which together with the foregoing will appear hereinafter where there is set forth by way of example, and not by way of limitation, the present preferred manner of producing chlorinated synthetic rubbers of the present invention to accomplish a plurality of desired results.

The production of chlorinated synthetic rubbers of the invention is as follows:

Synthetic rubbers of the butadiene-styrene copolymer type commonly known as GRS rubbers either in the latex form or the coagulum derived from the latex stage are chlorinated in solution in the presence of a metallic napthenate of group 1 of the periodic table of the elements, and more particularly in the presence of either sodium napthenate or copper napthenate. Copper napthenate has been used to bring about the desired results in amounts ranging from 0.1% to 10%. I have discovered that among other advantages the compound named will bring about the high density chlorinated rubber desired together with low viscosity in suitable solvents, and at the same time eliminate the need for certain oxidation processes in preparing chlorinated synthetic rubbers.

Example 1

100 parts of synthetic GRS rubber latex having a rubber polymer content of 42% are mixed with 5 parts of sodium napthenate. Chlorine is introduced into the mixture at room temperature until saturated to about 57% chlorine content. The mass is then run into mineral spirits which is kept agitated by a mixer. The chlorinated synthetic rubber precipitates as a dense whitish mass which is recovered by filtering. It is then water washed in a solution containing sodium carbonate and dried. When a 20% solution of the chlorinated synthetic rubber is prepared using toluol it has a viscosity of 20 centipoises. It is readily compatible with boiled linseed oil in solutions employing high flash naptha. The density of the dried chlorinated synthetic rubber power is 14 pounds per cubic foot.

Example 2

30 parts of the coagulum from a GRS latex which was recovered by means of the common acetic acid processing was put into solution using 1000 parts of carbon tetrachloride. 3 parts of copper napthenate having a copper content of 6% was admixed into the solution. Chlorine gas was bubbled thru the mass in the presence of ultra-violet light at room temperature. When the mass was fully saturated with chlorine it was poured into hot water which was agitated with a mixer which precipitated the chlorinated synthetic rubber in fine particle size. The rubber was recovered by filtering and was washed in a solution of sodium carbonate and dried. The chlorine content was 61.4%.

The chlorinated synthetic rubber so obtained had a viscosity or 20 centipoises when tested in a 20% solution using toluol. It was hard and dense in the dried powder form and had a weight equal to 14 pounds per cubic foot. It was easily soluble in Union 30 aromatic type petroleum solvent, high flash naptha and hydrogenated petroleum solvent.

When dissolved in high flash naptha to give a 30% solids content of the chlorinated rubber product it was brushed on 8 ounce duck to give a coating which was 35% the weight of the duck. The coating air dried hard in one hour. The duck was then cut up in small squares and a pack six deep was placed on a press under pressure of 600 p. s. i.×280F×3 minutes to obtain a fully fused, nondelaminating piece which was highly resistant overall to strong acids and alkalis.

I claim:

1. The process of production of chlorinated rubbers from butadiene-styrene copolymers which comprises reacting chlorine with a dispersion of said copolymer with carbon tetrachloride which contains a metallic napthenate from the group consisting of sodium napthenate and copper napthenate, said napthenate to be present in amounts from 0.1% to 10.0%.

2. The process of production of chlorinated synthetic rubbers from butadiene-styrene copolymers which comprises reacting chlorine with a dispersion of 30 parts of said copolymer with 1000 parts of carbon tetrachloride and 0.1% copper napthenate to produce a chlorinated synthetic rubber of high density and low solution viscosity which is stable to oxidation.

THERON P. REMY.

REFERENCES CITED

The following references are of record in the file of this patent:

UNITED STATES PATENTS

| Number | Name | Date |
|---|---|---|
| 2,005,320 | Konrad | June 18, 1935 |